(12) United States Patent
Hanada et al.

(10) Patent No.: US 9,736,991 B2
(45) Date of Patent: Aug. 22, 2017

(54) RECIPROCATING WORKING MACHINE

(71) Applicant: YAMABIKO CORPORATION, Ohme-shi, Tokyo (JP)

(72) Inventors: Kazuya Hanada, Ohme (JP); Hideyuki Amano, Ohme (JP)

(73) Assignee: YAMABIKO CORPORATION, Ohme-Shi, Tokyo (JP)

( * ) Notice: Subject to any disclaimer, the term of this patent is extended or adjusted under 35 U.S.C. 154(b) by 0 days.

(21) Appl. No.: 15/169,877

(22) Filed: Jun. 1, 2016

(65) Prior Publication Data

US 2016/0360708 A1 Dec. 15, 2016

(30) Foreign Application Priority Data

Jun. 10, 2015 (JP) .................................. 2015-117564

(51) Int. Cl.
*A01G 3/053* (2006.01)

(52) U.S. Cl.
CPC .................................. *A01G 3/053* (2013.01)

(58) Field of Classification Search
CPC ............ A01G 3/053; A01G 2003/0461; A01G 3/067; Y10T 74/18248; Y10T 29/49826; F16H 21/18
USPC ......... 30/216, 208, 209, 210, 215, 217, 218, 30/219, 220, 228, 205, 272.1, 41.9
See application file for complete search history.

(56) References Cited

U.S. PATENT DOCUMENTS

| 3,962,924 | A | | 6/1976 | Glover et al. | |
|---|---|---|---|---|---|
| 5,689,887 | A | * | 11/1997 | Heywood | B23D 49/006 30/216 |
| 7,788,811 | B2 | * | 9/2010 | Hanada | A01G 3/053 30/210 |
| 8,732,959 | B2 | * | 5/2014 | Lugert | A01G 3/053 30/216 |
| 9,357,711 | B2 | * | 6/2016 | Kato | A01G 3/053 |
| 2010/0146796 | A1 | * | 6/2010 | Geromiller | A01G 3/053 30/223 |
| 2011/0179651 | A1 | * | 7/2011 | Hittmann | A01G 3/053 30/216 |

FOREIGN PATENT DOCUMENTS

| EP | 2266389 A1 | 12/2010 |
|---|---|---|
| JP | 2004-8069 | 1/2004 |

OTHER PUBLICATIONS

European Search Report issued in European Patent Application No. 16172353.1 dated Nov. 11, 2016.

* cited by examiner

*Primary Examiner* — Ghassem Alie
(74) *Attorney, Agent, or Firm* — Baker & Hostetler LLP

(57) ABSTRACT

A reciprocating working machine has a lower blade and an upper blade overlapping each other. The lower and upper blades have respective elongated apertures slidably fit around lower and upper eccentric cams, respectively. The lower and upper eccentric cams are arranged at a 180-degree phase from each other. One of the upper eccentric cam and the lower blade has a beveled surface facing the other. The lower blade and the upper eccentric cam are relatively moved away from each other via the beveled surface.

7 Claims, 9 Drawing Sheets

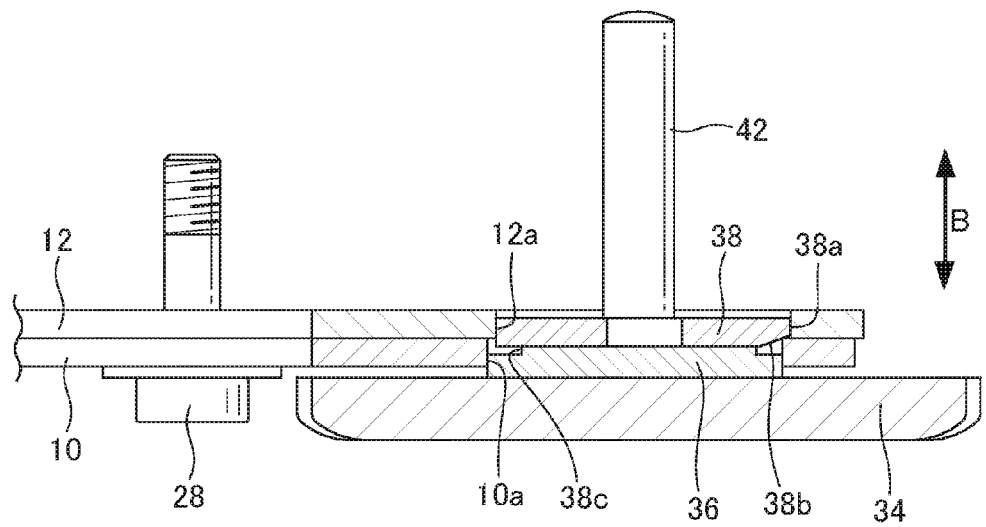
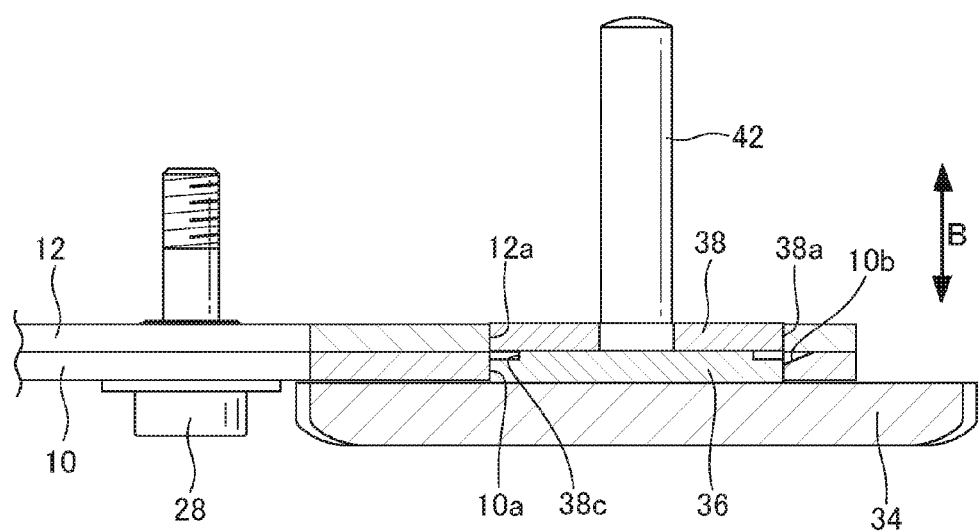

RECIPROCATING WORKING MACHINE

FIELD OF THE INVENTION

The present invention relates to a reciprocating working machine, more specifically to a reciprocating working machine in which a pair of blades with cutting edges are reciprocated.

BACKGROUND OF THE INVENTION

A reciprocating working machine for trimming garden trees and plants, such as a trimming machine (or hedge trimmer), a swing-type hedge trimmer and a lawn mower, is known. In the trimming machine, for example, a pair of blades (for example, upper and lower blades) with cutting edges are reciprocated relative to each other in opposite directions along a longitudinal direction. Further, in order to convert a rotary motion of a rotary power machine to a reciprocating motion of the pair of blades, a pair of eccentric cams ((or example, upper and lower eccentric cams) are eccentrically rotated by the rotary power machine and are slidably fitted into elongated apertures of the respective blades (For example, see Patent Publication 1). In order to move the pair of blades in the opposite directions, the pair of eccentric cams are arranged at a 180-degree phase from each other.

PRIOR ART PUBLICATION

Patent Publication 1: Japanese Patent Laid-open Publication No. 2004-008069

SUMMARY OF THE INVENTION

When the pair of blades are subjected to loads, operations of the blades may be stopped. Specifically due to the loads to the pair of blades, the upper and lower eccentric cams are moved downward so that both of the upper and lower eccentric cams may be simultaneously engaged with the elongated aperture of the lower blade. Since a direction in which the upper eccentric cam drives the lower blade is opposite to a direction in which the lower eccentric cam drives the lower blade, the upper eccentric cam and the lower eccentric cam lock each other so that operations of the blades are stopped.

Thus, an object of the present invention is to provide a reciprocating working machine which can prevent operations of the blades from being stopped by preventing both eccentric cams from locking each other with respect to one of the blades.

To achieve the above-stated object, a reciprocating working machine according to the present invention has a first blade and a second blade which are guided so as to reciprocate and disposed so as to overlap each other; and a first eccentric cam and a second eccentric cam which eccentrically rotate about a rotary shaft; wherein the first blade has an elongated aperture slidably fitted around the first eccentric cam so as to reciprocate the first blade; wherein the second blade has an elongated aperture slidably fitted around the second eccentric cam so as to reciprocate the second blade; wherein the first eccentric cam and the second eccentric cam are arranged at a 180-degree phase from each other; wherein the elongated aperture of the first blade and the elongated aperture of the second blade are adjacent to each other in a direction of the rotary shaft; wherein one of the first blade and the second eccentric cam has a beveled surface facing the other of the first blade and the second eccentric cam; and wherein when the first blade and the second eccentric cam are relatively moved in the direction of the rotary shaft so that the second eccentric cam is fitted into the elongated aperture of the first blade, the first blade and the second eccentric cam are relatively moved away from each other in the direction of the rotary shaft due to interaction via the beveled surface.

In this reciprocating working machine, normally the first eccentric cam and the second eccentric cam are slidably fitted into the elongated apertures of the first blade and the second blade, respectively. On the other hand, loads onto the first blade and the second blade cause the first blade and the second eccentric cam to move in the direction of the rotary shaft relative to each other so that the second eccentric cam may be fitted into the elongated aperture of the first blade. In this case, the eccentrically rotating second eccentric cam and the first blade are relatively moved away from each other in the direction of the rotary shaft due to interaction via the beveled surface. As a result, both of the first eccentric cam and the second eccentric cam get out of the situation of simultaneously engaging the elongated aperture of the first blade, and the first eccentric cam and the second eccentric cam can be prevented from locking each other to stop operations of the blades.

In an embodiment of the reciprocating working machine according to the present invention, the second eccentric cam may have the beveled surface facing the first blade, or the first blade may have the beveled surface facing the second eccentric cam.

In the embodiment of the reciprocating working machine according to the present invention in which the second eccentric cam has the beveled surface facing the first blade, preferably, the beveled surface of the second eccentric cam is arranged at least at an angular position where the second eccentric cam pushes the first blade due to the eccentric rotation of the second eccentric cam when the first eccentric cam and the second eccentric cam are aligned with a longitudinal axis of the elongated apertures of the first blade and the second blade.

In the embodiment of the reciprocating working machine according to the present invention in which the first blade has the beveled surface facing the second eccentric cam, preferably, the beveled surface of the first blade is arranged at least at a position where the beveled surface is pushed by the eccentrically rotating second eccentric cam when the first eccentric cam and the second eccentric cam are aligned with a longitudinal axis of the elongated apertures of the first blade and the second blade.

In an embodiment of the reciprocating working machine according to the present invention, preferably, the first blade and the second blade extend in a longitudinal direction, and the longitudinal axis of the elongated apertures of the first blade and the second blade extends perpendicular to the longitudinal direction of the first blade and the second blade.

In an embodiment of the reciprocating working machine according to the present invention, the beveled surface may be a planar surface or a curved surface.

As explained above, the reciprocating working machine according to the present invention can prevent operations of the blades from being stopped by preventing both eccentric cams from locking each other with respect to one of the blades.

BRIEF DESCRIPTION OF THE DRAWINGS

FIG. 9 is a cross-sectional view showing the blades and the eccentric cams at a position after rotating a little from the state shown in FIG. 8.

FIG. 10 is a cross-sectional view showing blades and eccentric cams in a second embodiment at a location similar to that shown in FIG. 7 at a normal time.

DETAILED DESCRIPTION OF EMBODIMENTS

Figure 1:
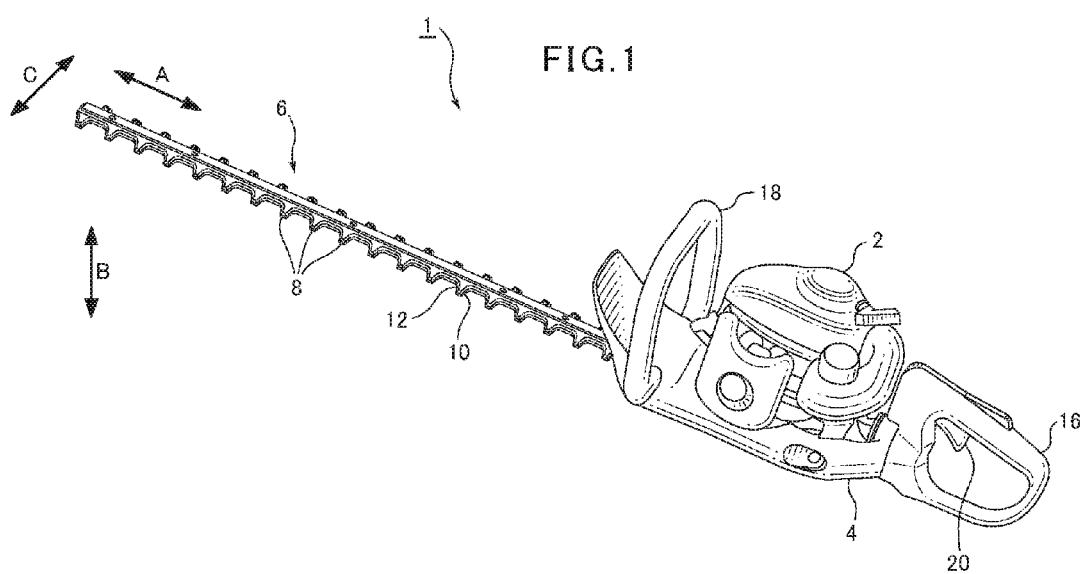
FIG. 1 is a perspective view of a trimming machine, which is an embodiment according to the present invention.

As shown in FIG. 1, a trimming machine 1 which is a first embodiment according to the present invention has an engine 2, a housing 4 to which the engine 2 is mounted, and a cutter blade assembly 6 extending from the housing 4 in a longitudinal direction A. The cutter blade assembly 6 has a pair of blades 10, 12 with cutting edges 8. The pair of blades 10, 12 are arranged so as to overlap each other, and are configured to slide and reciprocate in opposite directions relative to each other along the longitudinal direction A in order to trim garden trees and so on with the cutting edges 8. A power transmission mechanism 14 (see FIG. 2) for reciprocating the pair of blades 10, 12 is contained in the housing 4. Further, the housing 4 is provided with two handle grips 16, 18 for holding the trimming machine 1 with hands, and one of the handle grip 16 is provided with a throttle lever 20 for actuating or stopping the reciprocation of the pair of blades 10, 12 by adjusting a rotational speed of the engine 2.

In the explanation below, a side toward the housing 4 in the longitudinal direction A is referred to as "backward", while a side toward the cutter blade assembly 6 in the longitudinal direction A is referred to as "forward". Further, a direction in which the pair of blades 10, 12 overlap each other is referred to as a vertical direction B, a side toward the engine 2 is referred to as "upper", and an opposite side thereof is referred to as "lower". Further, a direction perpendicular to the longitudinal direction A and the vertical direction B is referred to as a lateral direction C.

Figure 2:
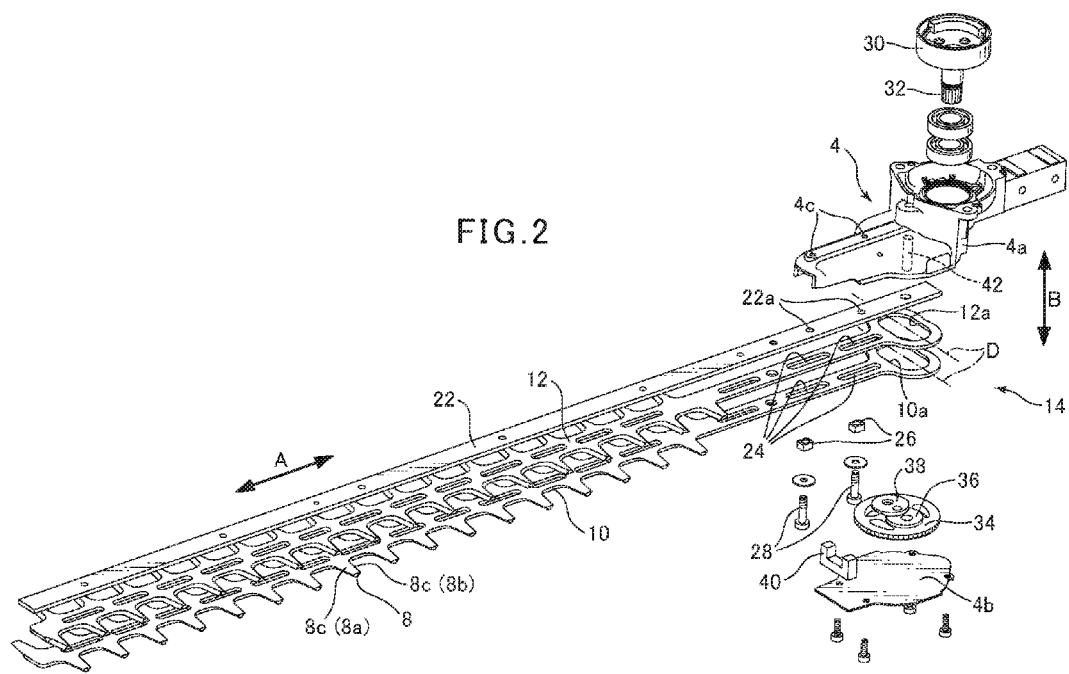
FIG. 2 is an exploded perspective view of a power transmission mechanism of the trimming machine shown in FIG. 1.

As shown in FIG. 2, the pair of blades 10, 12 consists of a lower blade 10 and an upper blade 12 guided so as to reciprocate and arranged so as to overlap each other. The lower blade 10 and the upper blade 12 are supported by a support plate 22. The support plate 22 has apertures 22a spaced from each other in the longitudinal direction A, and the apertures 22a are aligned with internal threads 4c of the housing 4. Further, the lower blade 10 and the upper blade 12 have also elongated apertures 24 which are aligned with the apertures 22a of the support plate 22, and extend in the longitudinal direction A. Collars 26 are fixed to the support plate 22 and the housing 4 with screws 28 so as to be slidably fitted into the elongated apertures 24. Thus, the lower blade 10 and the upper blade 12 are guided so as to reciprocate along the collars 26 in the longitudinal direction A.

The housing 4 has a housing body 4a opening downward, and a housing cover 4b. The engine 2 (not shown in FIG. 2) is mounted to the housing body 4a via a centrifugal clutch 30. The power transmission mechanism 14 has a smaller gear 32 fixed to the centrifugal clutch 30, a larger gear 34 mated with the smaller gear 32, and a lower eccentric cam 36 and an upper eccentric cam 38 which are mounted onto the larger gear 34. Further, a felt member 40 for preventing leakage of grease contained in the housing 4 is provided.

The larger gear 34 is rotatably attached to a rotary shaft 42 fixed to the housing body 4a. The lower eccentric cam 36 is mounted onto the larger gear 34, while the upper eccentric cam 38 is mounted onto the lower eccentric cam 36. The lower eccentric cam 36 and the upper eccentric cam 38 eccentrically rotate about the rotary shaft 42. The lower eccentric cam 36 and the upper eccentric cam 38 are substantially cylindrical, and are arranged at a 180-degree phase from each other. The larger gear 34 contacts and is supported by the housing cover 4b.

The lower blade 10 has an elongated aperture 10a slidably fitted around the lower eccentric cam 36 so as to reciprocate the lower blade 10. Similarly, the upper blade 12 has an elongated aperture 12a slidably fitted around the upper eccentric cam 38 so as to reciprocate the upper blade 12. A longitudinal axis D of the elongated aperture 10a of the lower blade 10 and the elongated aperture 12a of the upper blade 12 extends perpendicular to the longitudinal direction A of the lower blade 10 and the upper blade 12. Thus, the lower blade 10 and the upper blade 12 are configured to reciprocate one stroke between a forward position F and a backward position R (see FIGS. 4 and 6) when the larger gear 34 is rotated one revolution by the rotation of the engine 2. Further, as stated above, since the lower eccentric cam 36 and the upper eccentric cam 38 are arranged at the 180-degree phase from each other, when the lower blade 10 is moved from the forward position F to the backward position R, the upper blade 12 is moved from the backward position R to the forward position F, and reversely, when the lower blade 10 is moved from the backward position R to the forward position F, the upper blade 12 is moved from the forward position F to the backward position R. The elongated aperture 10a of the lower blade 10 and the elongated aperture 12a of the upper blade 12 are adjacent to each other in a direction of the rotary shaft 42.

FIGS. 3-6 show the lower blade 10 and the upper blade 12 at 0-degree, 90-degree, 180-degree and 270-degree positions, respectively.

The lower blade 10 and the upper blade 12 have a plurality of cutting edges 8 along the longitudinal direction A. In the present embodiment, the cutting edges 8 are provided on opposite sides with respect to the longitudinal direction A, and have edge portions 8c on an upper surface 8a and a lower surface 8b.

Figure 3:
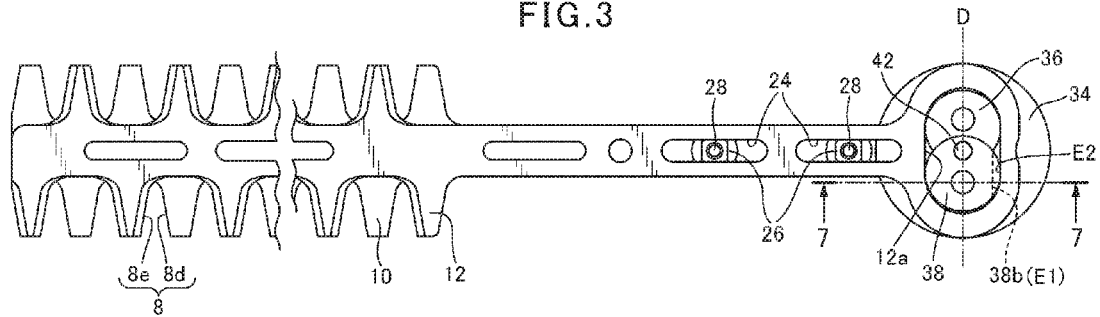
FIG. 3 is a plan view showing blades and eccentric cams at a 0-degree position.
Figure 4:
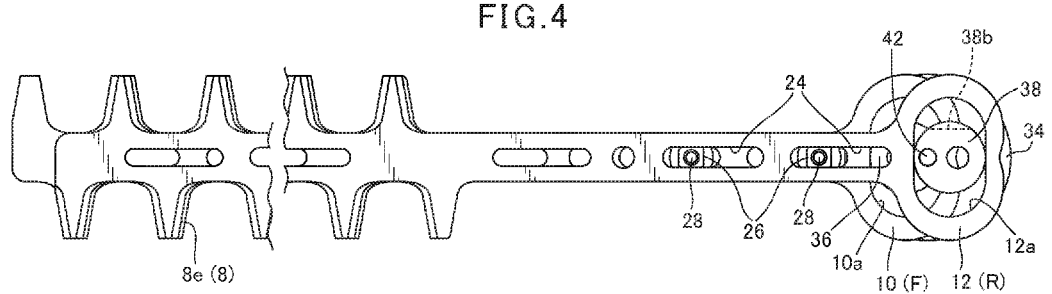
FIG. 4 is a plan view showing the blades and the eccentric cams at a 90-degree position.

The cutting edges 8 are arranged so that the cutting edges 8 of the lower blade 10, such as a cutting edge 8d, engage the forwardly adjacent cutting edges 8 of the upper blade 12, such as a cutting edge 8e, to perform a cutting operation, when the lower blade 10 is moved from the backward position R to the forward position F while the upper blade 12 is moved from the forward position F to the backward position R (see FIGS. 3 and 4). Further, the cutting edges 8 are arranged so that the cutting edges 8 of the lower blade 10, such as a cutting edge 8f, engage the backwardly adjacent cutting edges 8 of the upper blade 12, such as a cutting edge 8g, to perform a cutting operation, when the lower blade 10 is moved from the forward position F to the backward position R, while the upper blade 12 is moved from the backward position R to the forward position F (see FIGS. 5 and 6).

Figure 6:
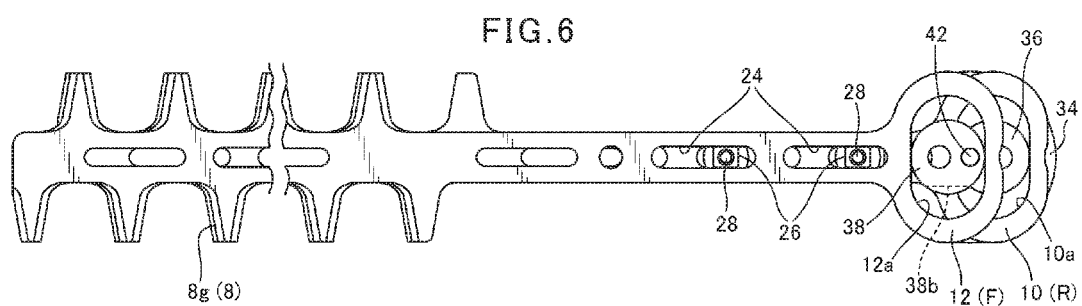
FIG. 6 is a plan view showing the blades and eccentric cams at a 270-degree position.

At the 90-degree position shown in FIG. 4 and the 270-degree position shown in FIG. 6, one of the lower blade 10 and the upper blade 12 is at the forward position F, while the other is at the backward position R. In the states shown in FIGS. 4 and 6, the lower blade 10 is sandwiched between the larger gear 34 and the upper eccentric cam 38.

Figure 5:
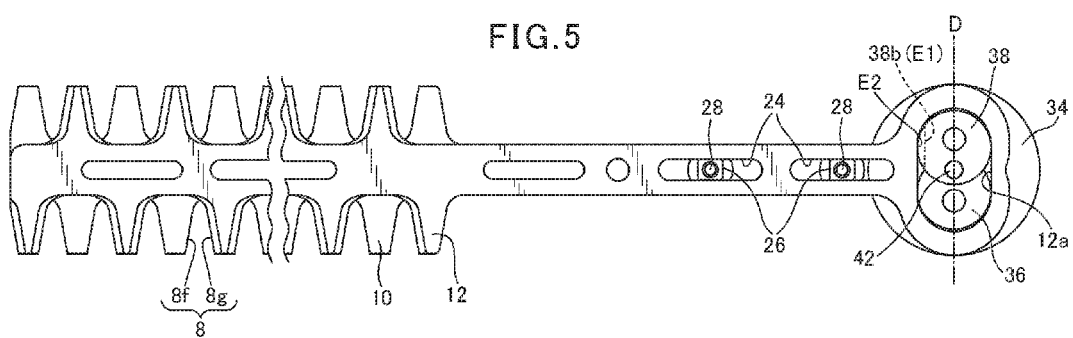
FIG. 5 is a plan view showing the blades and eccentric cams at a 180-degree position.

At the 0-degree position shown in FIG. 3 and the 180-degree position shown in FIG. 5, the lower blade 10 and the upper blade 12 are at an intermediate position. The lower eccentric cam 36 and the upper eccentric cam 38 are arranged in the lateral direction C orthogonal to the longitudinal direction A. Further, the elongated aperture 10a of the lower blade 10 and the elongated aperture 12a of the upper blade 12 are aligned with each other in the vertical direction B.

Figure 7:
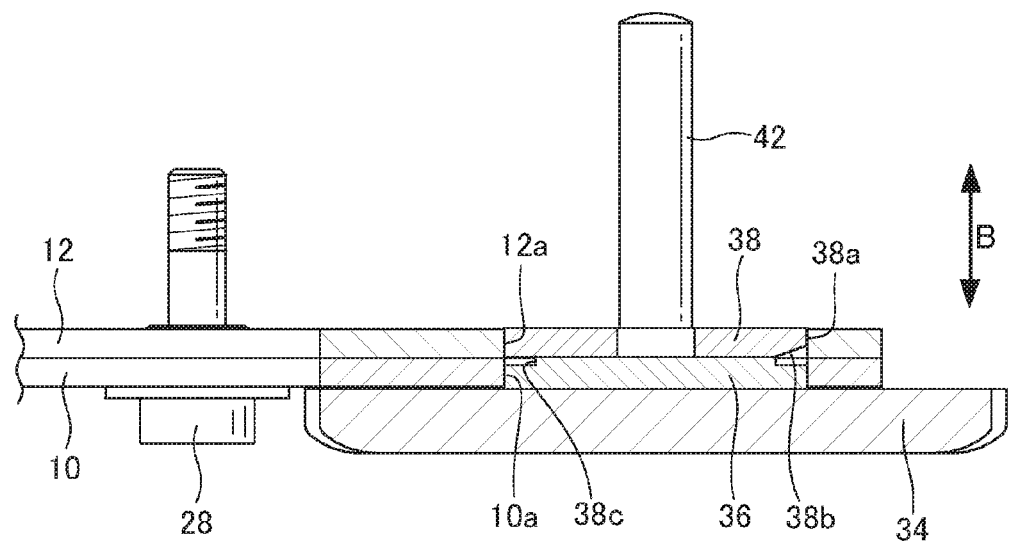
FIG. 7 is a cross-sectional view showing the blades and the eccentric cams along the line 7-7 shown in FIG. 3 at a normal time.

As shown in FIG. 7, the upper eccentric cam 38 has an abutment surface 38a abutting the elongated aperture 12a of the upper blade 12, and a beveled surface 38b facing the lower blade 10. The abutment surface 38a is a portion defining a cylindrical side surface of the upper eccentric cam 38, and specifically it is present over the periphery in an upper portion of the upper eccentric cam 38 and in an area except for the beveled surface 38b in a lower portion of the upper eccentric cam 38. The beveled surface 38b is arranged at an angular position E1 where the upper eccentric cam 38 pushes the lower blade 10 due to the eccentric rotation of the upper eccentric cam 38 when the lower eccentric cam 36 and the upper eccentric cam 38 are aligned with the longitudinal axis D of the elongated aperture 10a of the lower blade 10 and the elongated aperture 12a of the upper blade 12 (see FIGS. 3 and 5), and also arranged at an edge on a lower-eccentric-cam side of the upper eccentric cam 38. The beveled surface 38b is formed in a configuration which can move the upper eccentric cam 38 away from the lower blade 10 due to the eccentric rotation of the upper eccentric cam 38. For example, an angle between the beveled surface 38b and the lower blade 10 is preferably acute on a side toward a space which is formed between the beveled surface 38b and the lower blade 10 and inside of an outer radial edge of the upper eccentric cam 38. Further, the beveled surface 38b may be a planar surface or a curved surface (not shown).

In order to prevent the upper blade 12 from engaging the lower eccentric cam 36, a thickness of the lower blade 10 is preferably larger than a thickness of the side surface of the lower eccentric cam 36, and the lower eccentric cam 36 preferably has a reduced portion 38c in an upper portion of the lower eccentric cam 36.

Next, an operation of the trimming machine 1, which is the first embodiment according to the present invention.

When the engine 2 is operated and the centrifugal clutch 30 is operated with the throttle lever 20, the smaller gear 32 and the larger gear 34 are rotated. The rotation of the larger gear 34 causes the lower eccentric cam 36 and the upper eccentric cam 38 to rotate around the rotary shaft 42. According to this rotation, the lower blade 10 and the upper blade 12 are reciprocated in the longitudinal direction A.

Since the phases of the lower eccentric cam 36 and the phase of the upper eccentric cam 38 are shifted from each other by 180 degrees, when the lower blade 10 is moved from the backward position R to the forward position F, the upper blade 12 is moved from the forward position F to the backward position R. As such, the cutting edges 8 (8d) of the lower blade 10 and the cutting edges 8 (8e) of the upper blade 12 perform a cutting operation together. Subsequently, when the lower blade 10 is moved from the forward position F to the backward position R, the upper blade 12 is moved from the backward position R to the forward position F. As such, the cutting edges 8 (8f) of the lower blade 10 and the cutting edges 8 (8g) of the upper blade 12 perform a cutting operation together.

During the movement from the 0-degree position via the 90-degree position to the 180-degree position and the movement from the 90-degree position via the 270-degree position to the 0-degree position, the lower blade 10 is sandwiched between the larger gear 34 and the upper eccentric cam 38. Thus, when the pair of blades 10, 12 are subjected to loads, the lower blade 10 is prevented from being moved in the direction B of the rotary shaft 42 (vertical direction).

In the 0-degree position and the 180-degree position, the elongated aperture 10a of the lower blade 10 is aligned with the elongated aperture 12a of the upper blade 12 in the direction B of the rotary shaft 42 (vertical direction) (see FIG. 7). As such, when the pair of blades 10, 12 are subjected to loads, the upper eccentric cam 38 and the lower blade 10 may be moved relative to each other.

Figure 8:
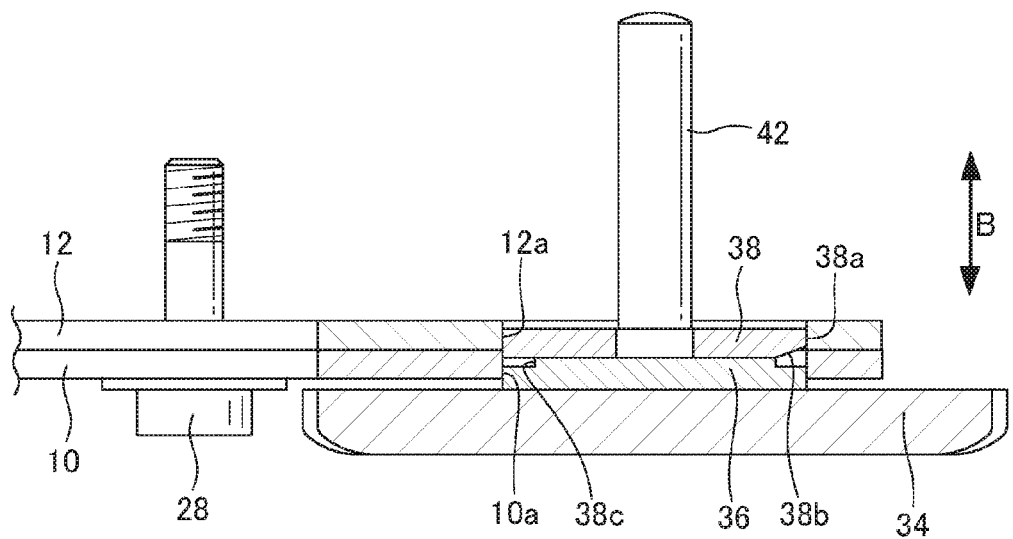
FIG. 8 is a cross-sectional view showing the blades and the eccentric cams along the line 7-7 shown in FIG. 3 at a loaded time.

When the loads onto the pair of blades 10, 12 cause the upper eccentric cam 38 to be moved relative to the lower blade 10 so as to come close to the lower blade 10 in the direction B of the rotary shaft 42 (vertical direction) (see FIG. 8), both of the lower eccentric cam 36 and the upper eccentric cam 38 are fitted in the elongated aperture 10a of the lower blade 10. As shown in FIG. 9, however, the beveled surface 38b of the eccentrically rotating upper eccentric cam 38 contacts the lower blade 10 to push it so that the upper eccentric cam 38 is moved away from the lower blade 10. As a result, both of the lower eccentric cam 36 and the upper eccentric cam 38 get out of the situation of simultaneously engaging the elongated aperture 10a of the lower blade 10, and thus, the lower eccentric cam 36 and the upper eccentric cam 38 are prevented from locking each other to stop the operations of the blade.

Next, the trimming machine which is a second embodiment according to the present invention will be explained. The trimming machine of the second embodiment is different from the trimming machine of the first embodiment only in that, instead of the beveled surface 38b provided on the upper eccentric cam 38 in the upper eccentric cam 38 in the first embodiment, a beveled surface 10b is provided on the lower blade 10 in the second embodiment. In this connection, explanations of portions of the second embodiment common to those in the trimming machine of the first embodiment are omitted.

As shown in FIG. 10, the lower blade 10 has the elongated aperture 10a abutting the lower eccentric cam 36, and a beveled surface 10b facing the upper eccentric cam 38. The beveled surface 10b is arranged at a location E2 where the beveled surface 10b is pushed by the eccentrically rotating upper eccentric cam 12 when the lower eccentric cam 36 and the upper eccentric cam 38 are aligned with the longitudinal axis D of the elongated aperture 10a of the lower blade 10 and the elongated aperture 12a of the upper blade 12 (see FIGS. 3 and 5), and also arranged at an edge on an upper-eccentric-cam side of the elongated aperture 10a of the lower blade 10a. The beveled surface 10b is formed in a configuration which can move the upper eccentric cam 38 away from the lower blade 10 due to the eccentric rotation of the upper eccentric cam 38. For example, an angle between the beveled surface 10b and the upper eccentric cam 38 is preferably acute on a side toward a space which is formed between the beveled surface 10b and the upper eccentric cam 38 and inside of an outer radial edge of the upper eccentric cam 38. Further, the beveled surface 10b may be a planar surface or a curved surface (not shown).

Next, an operation of the trimming machine which is the second embodiment according to the present invention will be explained The operation of the trimming machine 1 of the second embodiment is mostly the same as that of the trimming machine 1 which is the first embodiment so that only different portions will be explained, while explanations of the common portions will be omitted.

Figure 11:
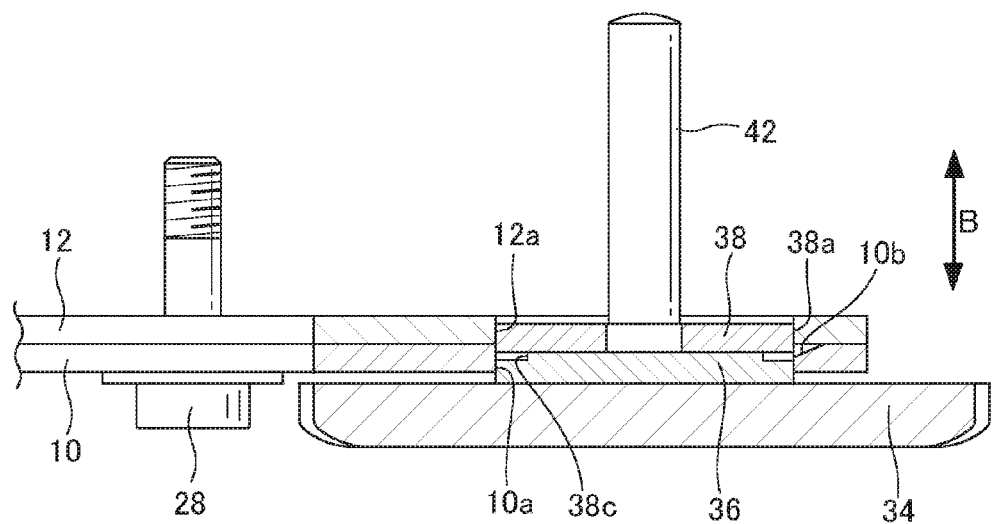
FIG. 11 is a cross-sectional view showing the blades and the eccentric cams in the second embodiment at a location similar to that shown in FIG. 7 at a loaded time.
Figure 12:
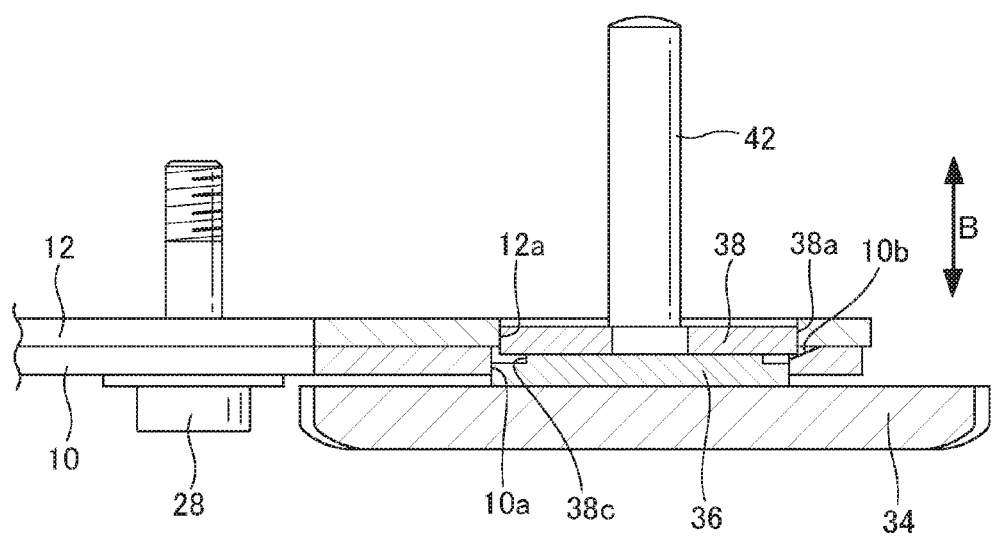
FIG. 12 is a cross-sectional view showing the blades and the eccentric cams at a position after rotating a little from the state shown in FIG. 11.

When the loads onto the pair of blades 10, 12 cause the upper eccentric cam 38 to be moved relative to the lower blade 10 so as to come close to the lower blade 10 in the direction of the rotary shaft 42 (see FIG. 11), both of the lower eccentric cam 36 and the upper eccentric cam 38 engage the elongated aperture 10a of the lower blade 10. As shown in FIG. 12, however, the eccentrically rotating upper eccentric cam 38 contacts the beveled surface 10b of the lower blade 10 and moves along the beveled surface 10b so that the upper eccentric cam 38 is moved away from the lower blade 10. As a result, both of the lower eccentric cam 36 and the upper eccentric cam 38 get out of the situation of simultaneously engaging the elongated aperture 10a of the lower blade 10, and thus, the lower eccentric cam 36 and the upper eccentric cam 38 are prevented from locking each other to stop the operations of the blade.

Although an embodiment of the present invention has been explained, the present invention is not limited to the embodiment, namely, many kinds of modifications can be done within the scope of the present invention, and it goes without saying that such modifications fall within the scope of the present invention.

In the above-stated first and second embodiments, the trimming machine 1 has been explained, but the reciprocating working machine according to the present invention may be a swing-type hedge trimmer, a lawn mower and so on.

Further, in the above-stated first and second embodiments, the lower blade 10 and the upper blade 12 are reciprocated in the longitudinal direction A, but the lower blade and the upper blade may be swung around a pivot axis so as to be substantially reciprocated in the lateral direction C. If this is the case, the elongated apertures of the lower blade and the upper blade may extend, for example, in the direction A perpendicular to the lateral direction C.

In the above-stated first embodiment, the beveled surface 38b of the upper eccentric cam 38 is arranged at the angular location E1, but the beveled surface may be additionally provided at any location. For example, additionally providing another beveled surface at the opposite side of the angular position E1 is preferable when the larger gear 34 rotates in opposite directions. Further, the beveled surface 38b may be provided over the periphery of the upper eccentric cam 38.

In the above-stated second embodiment, the beveled surface 10b of the lower blade 10 is arranged at the location E2, but another beveled surface may be additionally provided at any location. For example, additionally providing another beveled surface at the opposite side of the location E2 is preferable when the larger gear 34 rotates in opposite directions. Further, the beveled surface 10b may be provided over the peripheral of the elongated aperture 10a of the lower blade 10.

A configuration of a portion of the lower blade 10 which the beveled surface 38 of the upper eccentric cam 38 contacts in the above-stated first embodiment and a configuration of a portion of the upper eccentric cam 38 which the beveled surface 10b of the lower blade 10 contacts in the above-stated second embodiment are arbitrary so long as the eccentric rotation of the upper eccentric cam 38 cause the upper eccentric cam 38 and the lower blade 10 to be relatively moved away from each other, and such a configuration may be a beveled surface.

In the above-stated first and second embodiments, a situation where the lower eccentric cam 36 and the upper eccentric cam 38 are simultaneously fitted into the lower blade 10 is explained, but in another situation where the lower eccentric cam 36 and the upper eccentric cam 38 are simultaneously fitted into the upper blade 12, one of the lower eccentric cam 36 and the upper blade 12 has a beveled surface facing the other of the lower eccentric cam 36 and the upper blade 12.

What is claimed:

1. A reciprocating working machine comprising:
    a first blade and a second blade which are guided so as to reciprocate and disposed so as to overlap each other; and
    a first eccentric cam and a second eccentric cam which eccentrically rotate about a rotary shaft;
    wherein the first blade has an elongated aperture slidably fitted around the first eccentric cam so as to reciprocate the first blade;
    wherein the second blade has an elongated aperture slidably fitted around the second eccentric cam so as to reciprocate the second blade;
    wherein the first eccentric cam and the second eccentric cam are arranged at a 180-degree phase from each other;
    wherein the elongated aperture of the first blade and the elongated aperture of the second blade are adjacent to each other in a direction of the rotary shaft;
    wherein one of the first blade and the second eccentric cam has a beveled surface facing the other of the first blade and the second eccentric cam; and
    wherein when the first blade and the second eccentric cam are relatively moved in the direction of the rotary shaft so that the second eccentric cam is fitted into the elongated aperture of the first blade, the first blade and the second eccentric cam are relatively moved away from each other in the direction of the rotary shaft due to interaction via the beveled surface.

2. The reciprocating working machine according to claim 1, wherein the second eccentric cam has the beveled surface facing the first blade.

3. The reciprocating working machine according to claim 2, wherein the beveled surface of the second eccentric cam is arranged at least at an angular position where the second eccentric cam pushes the first blade due to the eccentric rotation of the second eccentric cam when the first eccentric cam and the second eccentric cam are aligned with a longitudinal axis of the elongated apertures of the first blade and the second blade.

4. The reciprocating working machine according to claim 1, wherein the first blade has the beveled surface facing the second eccentric cam.

5. The reciprocating working machine according to claim 4, wherein the beveled surface of the first blade is arranged at least at a position where the beveled surface is pushed by the eccentrically rotating second eccentric cam when the first eccentric cam and the second eccentric cam are aligned with a longitudinal axis of the elongated apertures of the first blade and the second blade.

6. The reciprocating working machine according to claim 1,
wherein the first blade and the second blade extend in a longitudinal direction, and
wherein the longitudinal axis of the elongated apertures of the first blade and the second blade extends perpendicular to the longitudinal direction of the first blade and the second blade.

7. The reciprocating working machine according to claim 1, wherein the beveled surface is a planar surface or a curved surface.

* * * * *